Figure 1:
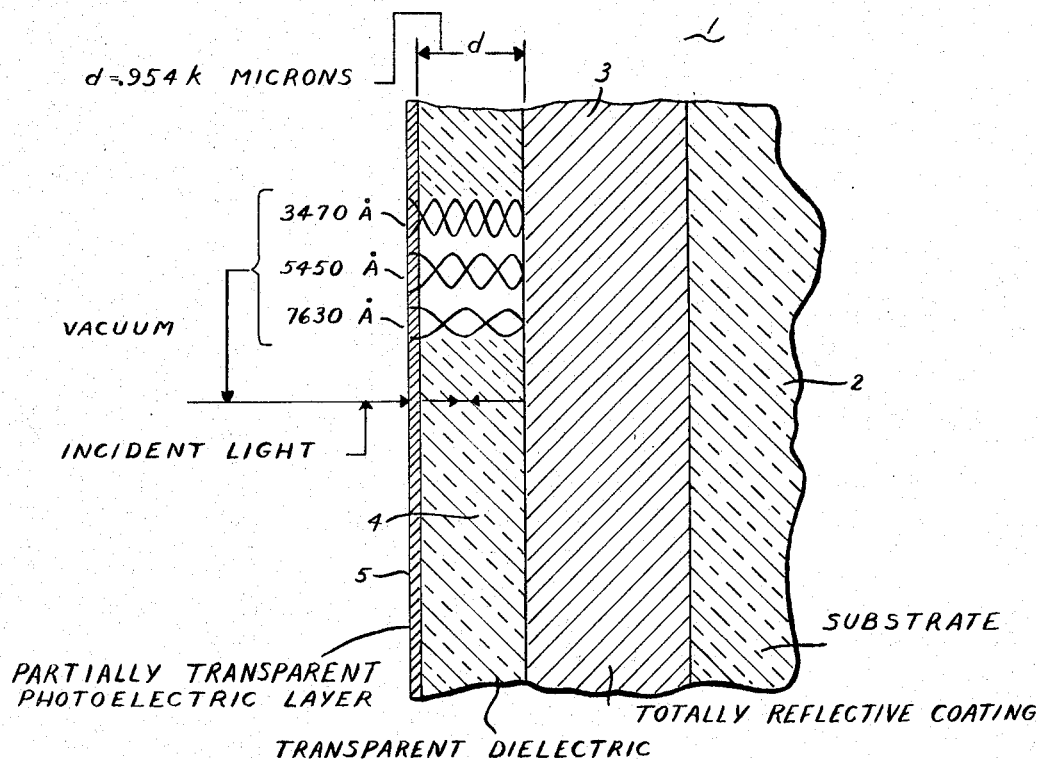

United States Patent Office 3,301,705
Patented Jan. 31, 1967

3,301,705
INTERFERENCE PHOTOCATHODE SENSITIVE TO MULTIPLE BANDS
Radames K. H. Gebel, Dayton, Ohio, assignor to the United States of America as represented by the Secretary of the Air Force
Filed Sept. 17, 1963, Ser. No. 309,581
2 Claims. (Cl. 117—201)

The invention described herein may be manufactured and used by or for the United States Government for governmental purposes without payment to me of any royalty thereon.

This invention relates to photocathodes for use at very low light levels. In particular, it is the object of the invention to provide a photocathode with increased sensitivity to the illumination provided by the night sky. As such, it may be used as the light sensitive input element for a light amplifying system employed to lower the threshold of night vision or to decrease the exposure time for natural light photography at night.

One method of increasing the sensitivity of a photocathode is to so design it that the maximum amount of the incident light is absorbed in the photoemissive layer or, in other words, so that the minimum amount of incident light is lost through reflection from or by passing through the photoemissive layer. A known design for acomplishing this result is described in the patent to Kossel, 2,972,691, Feb. 21, 1961. In this design a totally reflecting surface or mirror is coated with a thin layer of a suitable transparent dielectric which in turn is coated with a thin partially transparent film of a photoemissive material. For light of a particular wavelength, the reflectivity of such a photocathode can be greatly reduced and the absorption of light by the photosensitive film greatly increased if the thickness of the dielectric layer, i.e., the spacing between the photosensitive film and the totally reflecting surface, is made equal to one-quarter of the particular wavelength or an odd multiple thereof. Such devices are referred to as interference photocathodes since the great increases in sensitivity and selectivity are due to light wave interference phenomena.

While the very narrow spectral response of an interference photocathode is desirable in many applications, this characteristic is not advantageous in a photocathode for use at extremely low levels of illumination with light containing several spectral bands since it would normally be insensitive to all but one narrow band. Specifically, the peaks of the three different bands of the night sky radiation fall in the ranges: 3200–3600 A., 5400–5700 A. and 7500–8000 A. Therefore, to obtain maximum total sensitivity, an interference photocathode having sensitivity peaks, or minimum reflectivity points, falling within these ranges would be desirable. In accordance with the invention, this is accomplished by making the thickness of the transparent dielectric layer separating the photosensitive film from the totally reflecting surface equal to an odd multiple of a quarter wavelength for each of three wavelengths falling within the above three ranges. The minimum thickness satisfying this condition for the three ranges given is .954$k$ micron, where $k$ is an experimentally determined constant very close to unity and dependent upon the material used. This thickness is $11/4\lambda$ for 3470 A., $7/4\lambda$ for 5450 A. and $5/4\lambda$ for 7630 A.

The above technique is of course not limited to use with light from the night sky but may be employed with other light sources of other spectral compositions.

Figure 2:
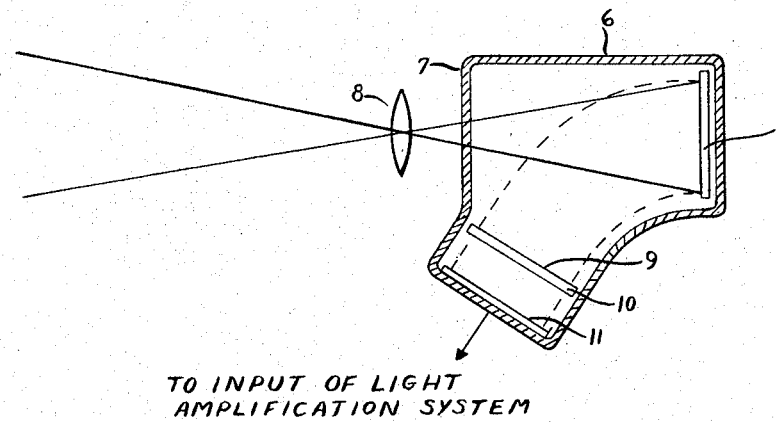

The invention will be described more fully with reference to the accompanying drawings in which FIG. 1 is a greatly enlarged cross-section of a portion of an interference photocathode constructed in accordance with the invention, and FIG. 2 illustrates one manner in which the photocathode of FIG. 1 may be used as the light sensing input of a light amplifier.

Referring to FIG. 1 the interference photocathode 1 is supported by a substrate 2 which may be a glass plate, for example. This plate is coated with a totally reflective layer 3 such as a layer of aluminum, silver, gold or other suitable material. A layer 4 of a suitable dielectric material, such as silica, zinc oxide or zinc sulphide, transparent to the radiation of interest, is then applied over the reflecting layer 3. On top of this is a thin partially transparent film 5 of photoemissive material which is the photocathode element.

Incident light falling upon the photocathode from the left for the most part passes through the partially transparent photoemissive layer 5 and is totally reflected from the surface of layer 3. Interference between the light approaching the surface of layer 3 and that reflected from this surface produces standing waves of light in the space between the thin film photocathode element 5 and layer 3. Since the boundary condition at the surface of conductive layer 3 requires that the electric vector of the light wave be zero at this surface, a node of the standing wave must occur at this point. Consequently, antinodes of the standing wave occur at odd multiples of a quarter wavelength from the reflecting surface.

As seen from the above, if the photosensitive layer 5 is spaced from the surface of reflecting coating 3 by an odd multiple of a quarter wavelength of the incident light it will be located at an antinode of the standing wave and thus subjected to a maximum of light intensity. This spacing therefore provides a maximum emission of electrons. It also provides a minimum of reflection from the photocathode due to destructive interference of the reflected light at the outer surface of layer 5. The destructive interference results from the fact that the light reflected from the surface of layer 3 and passing through layer 5 is opposite in phase to the light reflected from the surface of layer 5, equal phase shifts of $\pi$ radians being produced by reflection from the surfaces of layers 5 and 3 and a phase shift of an odd multiple of $\pi$ radians being produced by twice traversing the distance $d$ between the two layers. Consequently, an interference photocathode has maximum electronemission and minimum reflectivity when the spacing $d$ between the photoemissive layer and the totally reflecting surface is an odd multiple of a quarter wavelength of the incident light.

The photocathode in FIG. 1 is designed, in accordance with the invention, for maximum total sensitivity to light from the night sky. As stated earlier, the peaks of the three principal bands of this radiation occur in the ranges 3200–3600 A., 5400–5700 A. and 7500–8000 A. In accordance with the invention, the spacing $d$ is made such that it is an odd multiple of a quarter wavelength for each of three wavelengths falling within the above three ranges. The smallest dimension satisfying this condition is .954$k$ micron, where $k$ is determined experimentally and depends principally upon the velocity of light in the material of which space 4 is made. Neglecting the effect of layer 5, $k$ would be unity for a vacuum between layers 5 and 3. For $d=.954k$, the spacing squals $11/4\lambda$ for 3470 A., $7/4\lambda$ for 5450 A. and $5/4\lambda$ for 7630 A., as illustrade by the standing waves sketched in FIG. 1.

With this design, the photocathode acts as an interference photocathode at three wavelengths and has a maximum of light absorption and electron emission at these wavelengths, greatly increasing the total sensitivity to night sky radiation over what it would be were the interference photocathode designed for a single wavelength following conventional practice.

For sensitivity to night radiation the photoemissive layer 5 may be a multi-alkali material such as a material of composition [Cs](NaK)$_3$Sb or [Cs](NaK)$_3$SbO with S–20 response, or it may be a material of composition Ag-O-Cs with S–1 response. For interference photocathodes the thickness of the photoemissive film 5 is small compared with a quarter wavelength of the radiation of interest, for example, 50 to 300 A. Film 5 is not drawn to scale in FIG. 1 for ease of illustration.

In constructing an interference photocathode of the above-described type the exact value of the spacing $d$ is best determined experimentally. This may be accomplished by constructing a photocathode of the materials to be used that is identical to that illustrated in FIG. 1 except that the layer 4 is in the form of a wedge varying linearly in thickness a small distance above and below the calculated free space thickness of .954 micron. A single small spot of light composed of the wavelengths 3470 A., 5450 A. and 7630 A. is then moved along the photocathode and either the reflected light or the emitted photoelectrons, or both, measured by suitable indicating apparatus. The proper value of $d$ is at the position of the spot where the reflectivity is a minimum and the electron emission is a maximum. The correct value of $d$ may then be measured with an interferometer. Where electron emission is measured, the test wedge and photoelectron collector would of course have to be in an evacuated chamber. The three test wavelengths of interest may be accurately derived from a tungsten source using filters. Filters of sufficiently narrow bandwidth and harmonic rejection for this purpose are available commercially, for example, the Spectracode Monopass filters available from Optics Technology, Inc., Belmont, California.

FIG. 2 illustrates a manner in which a multiple band interference photocathode of the type shown in FIG. 1 may be used as an input for a light amplification system. The interference photocathode 1 is housed in an evacuated envelope 6 having a transparent opposite wall 7 through which an optical image of the field of view is formed on the photocathode by a suitable lens system 8. The resulting photoelectron emission from the photocathode constitutes an electron image which is brought to focus on the input side 9 of an image intensifier plate 10 by suitable electron optics (not shown). The intensified electron image from the other side of plate 10 is then accelerated toward and focused upon phosphor screen 11 which converts it back to an optical image with a gain in brightness over the input image on photocathode 1. This image is then applied, by a suitable lens system or by fiber optics, to the input photocathode of a light amplification system such as shown, for example, in my Patent 2,955,158, issued Oct. 4, 1960. This patent also describes the construction and operation of a suitable image intensifier plate 10.

While a specific form of the invention for use with the light from the night sky has been described, it is not limited thereto but may be applied wherever it is desired to make an interference photocathode sensitive to more than one wavelength. For example, it may be used to provide a single receiver for the efficient reception of beams from a plurality of laser transmitters operating at different wavelengths.

I claim:

1. An interference photocathode having high sensitivity to radiation from the night sky comprising: means providing a flat totally reflecting surface, a layer of dielectric material of uniform thickness and transparent to the principal bands of radiation from the night sky on said reflecting surface, and a thin partially transparent film of photoemissive material sensitive to the principal bands of radiation from the night sky on said dielectric layer, whereby radiation normally incident on said photoemissive film produces standing waves in said dielectric layer; said photoemissive film having a thickness lying in the range 50 A.–300 A. and the thickness of said dielectric layer being the minimum value for which said photoemissive film is positioned at an antinode of each of the standing waves of wavelength 3470 A., 5450 A. and 7630 A., said minimum value being .954$k$ micron where $k$ is close to unity and dependent principally upon the velocity of light in said dielectric material.

2. An interference photocathode sensitive to light of a plurality of wavelengths comprising: means providing a flat totally reflecting surface, a layer of transparent dielectric material of uniform thickness on said reflecting surface, and a thin partially transparent film of a photoemissive material on said dielectric layer, whereby light normally incident on said photoemissive film produces standing waves in said dielectric layer; said photoemissive film having a thickness lying in the range 50 A.–300 A. and the thickness of said dielectric layer being the minimum value for which said photoemissive film is positioned at an antinode of each of the standing waves produced by light of each of said plurality of wavelengths.

References Cited by the Examiner
UNITED STATES PATENTS

| | | | |
|---|---|---|---|
| 3,235,397 | 2/1966 | Millendorfer | 117—33.3 |
| 3,254,253 | 5/1966 | Davis et al. | 313—10 |

ALFRED L. LEAVITT, *Primary Examiner.*

W. L. JARVIS, *Assistant Examiner.*